US012748389B2

(12) United States Patent
Wang et al.

(10) Patent No.: US 12,748,389 B2
(45) Date of Patent: Sep. 29, 2026

(54) METHOD FOR PREDICTING BENCHMARK VALUE OF UNIT EQUIPMENT BASED ON XGBOOST ALGORITHM AND SYSTEM THEREOF

(71) Applicant: Huaneng Shanghai Combined Cycle Power Co, Ltd., Shanghai (CN)

(72) Inventors: Yongkang Wang, Shanghai (CN); Gang Xu, Shanghai (CN); Ruijie Chen, Shanghai (CN); Chen Wang, Shanghai (CN); Qingping Li, Shanghai (CN); Bin Wu, Shanghai (CN); Yi Gong, Shanghai (CN)

(73) Assignee: HUANENG SHANGHAI COMBINED CYCLE POWER CO. LTD., Shanghai (CN)

( * ) Notice: Subject to any disclaimer, the term of this patent is extended or adjusted under 35 U.S.C. 154(b) by 568 days.

(21) Appl. No.: 17/979,787

(22) Filed: Nov. 3, 2022

(65) Prior Publication Data

US 2023/0213895 A1 Jul. 6, 2023

(30) Foreign Application Priority Data

Dec. 30, 2021 (CN) ........................ 202111681654.1

(51) Int. Cl.
*G05B 13/02* (2006.01)
*G05B 13/04* (2006.01)

(52) U.S. Cl.
CPC ....... *G05B 13/0265* (2013.01); *G05B 13/042* (2013.01)

(58) Field of Classification Search
None
See application file for complete search history.

(56) References Cited

U.S. PATENT DOCUMENTS 11,720,962 B2 * 8/2023 Kamkar ................. G06Q 40/03 705/38
12,093,817 B2 * 9/2024 Kuo ..................... G06N 3/0464
(Continued)

*Primary Examiner* — Hua Lu

(57) ABSTRACT

The invention relates to a method for predicting benchmark value of unit equipment based on XGBoost algorithm and a system thereof, wherein the method comprises the following steps: the historical operation data of unit equipment is obtained, the data is preprocessed, and a data set containing a plurality of samples is constructed, and each sample includes the benchmark value of a plurality of parameters of the equipment corresponding to a plurality of features; RF out-of-bag estimation is used for feature importance calculation to eliminate the features with low importance; the data is standardized to eliminate the dimensional effects among features; the data set is input to construct an XGBoost model, and Bayesian super parameter optimization is conducted to obtain the prediction model of benchmark values; and the real-time data of equipment operation is input, and the benchmark values of various equipment parameters are predicted by the prediction model of benchmark values. Compared with the prior art, the invention mines the correlation among data based on the XGBoost algorithm to predict a reasonable equipment benchmark value, and has the advantages of high generalization ability, high prediction accuracy and operation speed and great improvement of the automation ability of the unit.

5 Claims, 1 Drawing Sheet

(56) References Cited

U.S. PATENT DOCUMENTS

| | | | | |
|---|---|---|---|---|
| 12,182,670 | B1 * | 12/2024 | Beauchesne | G06N 5/046 |
| 2013/0044944 | A1 * | 2/2013 | Wang | G06F 18/24323<br>707/769 |
| 2017/0228645 | A1 * | 8/2017 | Wang | G06N 3/084 |
| 2017/0286810 | A1 * | 10/2017 | Shigenaka | G06V 10/82 |
| 2019/0086912 | A1 * | 3/2019 | Hsu | G05B 23/0281 |
| 2020/0380037 | A1 * | 12/2020 | Zhao | G06F 16/90344 |
| 2021/0011771 | A1 * | 1/2021 | Bonderson | G06N 10/70 |
| 2021/0026314 | A1 * | 1/2021 | Phan | G05B 13/0265 |
| 2021/0117787 | A1 * | 4/2021 | Stal | G06N 3/08 |
| 2021/0117869 | A1 * | 4/2021 | Plumbley | G06F 18/217 |
| 2021/0180439 | A1 * | 6/2021 | Rawlinson | E21B 47/04 |
| 2021/0182357 | A1 * | 6/2021 | Partee | G05B 17/02 |
| 2021/0192370 | A1 * | 6/2021 | Toubiana | G16B 40/00 |
| 2021/0334914 | A1 * | 10/2021 | Sadot | G06N 20/00 |
| 2021/0350203 | A1 * | 11/2021 | Das | G06N 3/08 |
| 2021/0358564 | A1 * | 11/2021 | Feinberg | G16C 20/30 |
| 2022/0008976 | A1 * | 1/2022 | Sekimoto | B21B 1/26 |
| 2022/0067249 | A1 * | 3/2022 | Steingrimsson | G06F 30/28 |
| 2022/0092473 | A1 * | 3/2022 | Lee | G06F 18/251 |
| 2022/0108195 | A1 * | 4/2022 | Kehler | G06T 15/08 |
| 2022/0128983 | A1 * | 4/2022 | Zhang | G05B 23/0283 |
| 2022/0188521 | A1 * | 6/2022 | Mu | G06F 40/295 |
| 2022/0261520 | A1 * | 8/2022 | Shigemori | G06F 30/27 |
| 2022/0283575 | A1 * | 9/2022 | Mehta | G05B 13/0265 |
| 2022/0285938 | A1 * | 9/2022 | Mehta | H02J 3/004 |
| 2022/0318641 | A1 * | 10/2022 | Carreira-Perpiñán | G06N 5/01 |
| 2022/0335736 | A1 * | 10/2022 | Tizhoosh | G06V 10/761 |
| 2022/0374827 | A1 * | 11/2022 | Lee | G06F 17/12 |
| 2022/0397874 | A1 * | 12/2022 | Peng | G06Q 50/06 |
| 2023/0074606 | A1 * | 3/2023 | Jesus | G06N 3/0475 |
| 2023/0167997 | A1 * | 6/2023 | Bistany | F24F 11/526<br>700/276 |
| 2023/0185652 | A1 * | 6/2023 | Hauser | G06N 5/046<br>714/38.1 |
| 2024/0244410 | A1 * | 7/2024 | Fei | H04W 4/021 |
| 2024/0320524 | A1 * | 9/2024 | Shen | G06N 3/08 |

* cited by examiner

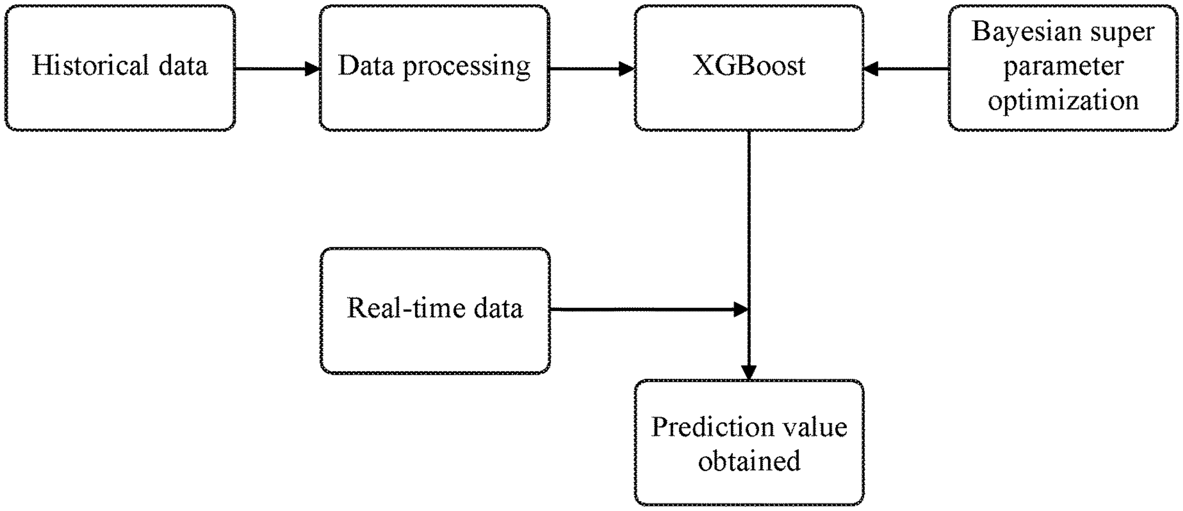
Historical data
Data processing
XGBoost
Bayesian super parameter optimization
Real-time data
Prediction value obtained

METHOD FOR PREDICTING BENCHMARK VALUE OF UNIT EQUIPMENT BASED ON XGBOOST ALGORITHM AND SYSTEM THEREOF

TECHNICAL FIELD

The invention relates to the technical field of predicting benchmark values of unit equipment, in particular to a method for predicting benchmark value of unit equipment based on XGBoost algorithm and a system thereof.

BACKGROUND ART

With increasingly higher national requirements for the equipment management of electric power enterprises, in recent years, power generation units gradually take efficiency increase, energy saving, environment protection and cost reduction as their development goals. Especially for the units with deep peak load regulation capacity, strict assessment standards and complex operating conditions contradict each other, resulting in increasingly severe economic situation of thermal power units relying on traditional control means.

The benchmark value of the equipment refers to the optimal value (or a range) that a certain operating parameter (e.g. main steam pressure, vacuum, etc.) shall reach under normal operating conditions of the equipment under a certain load. Therefore, the benchmark value is also called expected value. When any operating parameter deviates from the benchmark value, the system causes various energy losses. Therefore, the determination of the benchmark values of the main parameters under the operating conditions helps to guide the operators in economical operation, and is the important basis for energy consumption analysis of the power plant and the auxiliary means for monitoring equipment failures. When the unit operates under rated conditions, the parameter values under rated conditions can be used as the benchmark parameters. However, due to the expansion of the power grid scale and the increasingly prominent contradiction between peak and valley, the thermal power units with large capacity and high efficiency have to adjust the peak frequently; thus, the units operate under the condition of deviating from the rated conditions, and the parameter values under the rated conditions can no longer be used as the benchmark values of operating parameters. Determining the benchmark values of operating parameters is of great significance for improving the economical unit operation under different loads, which is conducive to reducing power supply costs, improving the economic benefits of power station, saving energy consumption and reducing pollution.

How to make full use of the platforms of the Internet and big data to raise the quality of equipment modeling, so as to improve the operating efficiency of the units, has become the focus of the current energy industry. Based on this, when predicting the equipment operation benchmark values, early warning of intelligent monitoring points and equipment fault detection in power plants are particularly important.

At present, the modeling method for predicting unit equipment benchmark values mainly adopts manual modeling and machine learning algorithms. The traditional manual modeling method requires the knowledge and experience of the implementers, and often has such problems as complex operation, low prediction accuracy, slow calculation process, and long implementation period. In the machine learning algorithms widely used for equipment operation benchmark prediction, such as data mining technology and support vector machine method applied to the system of early warning of faults, the data mining technology face such problems as insufficient fitting and poor logical regression, and the support vector machine method is also difficult to be implemented for large-scale training samples.

Content of Invention

The invention aims to provide a method for predicting benchmark value of unit equipment based on XGBoost algorithm and a system thereof in order to overcome the defects of the prior art.

The purpose of the invention is realized by the following technical solution: A method for predicting benchmark value of unit equipment based on XGBoost algorithm comprises the following steps:

- S1. The historical operation data of unit equipment is obtained, the data is preprocessed, and a data set containing a plurality of samples is constructed, and each sample includes the benchmark value of a plurality of parameters of the equipment corresponding to a plurality of features;
- S2. RF out-of-bag estimation is used for feature importance calculation to eliminate the features with low importance;
- S3. The data is standardized to eliminate the dimensional effects among features;
- S4. The data set is input to construct an XGBoost model, and Bayesian super parameter optimization is conducted to obtain the prediction model of benchmark values;
- S5. The real-time data of equipment operation is input, and the benchmark values of various equipment parameters are predicted by the prediction model of benchmark values.

Furthermore, step S1 comprises the following:

- S11. The historical operation data of the equipment is obtained from the plant level supervisory information system SIS of the unit;
- S12. The data is checked for blank values and outliers, and the data with blank values and outliers are eliminated;
- S13. Straightened line type data is filtered;
- S14. Data features are dimensionally reduced by PCA to obtain a data set containing multiple samples, and each sample contains multiple features.

Furthermore, step S2 comprises the following:

For each feature of the sample, the random forest (RF) out-of-bag estimation is used to rank the importance of the features and select the features. The average precision decline rate (MDA) is used as an indicator to calculate the importance of the feature. The formula is as follows:

$$MDA = \frac{1}{n}\sum\nolimits_{t=1}^{n}(errOOB_t - errOOB'_t),$$

Wherein, n is the number of base classifiers constructed by random forests, $errOOB_t$ is the out-of-bag error of the $t^{th}$ base classifier, and errOOB' is the out-of-bag error of the $t^{th}$ base classifier after noise is added. The more MDA decreases, the higher the importance of the feature.

Furthermore, in step S3, the data set contains N samples, each sample has L-type features, and Z-score standardization method is used to standardize each type of features of each sample, as follows:

$$x_{nl}^{*} = \frac{x_{nl} - \mu_l}{\sigma_l}$$

Wherein, $x_{nl}$ is the feature data of the type 1 features of the $n^{th}$ sample, and $$x_{nl}^{*}$$

is the feature data of the type 1 features of the $n^{th}$ sample after standardization, $\mu_1$ is the mean value of the feature data of the type 1 features in the $N^{th}$ sample, and $\sigma_l$ is the standard deviation of the feature data of the type 1 features in the $N^{th}$ sample.

Furthermore, step S4 comprises the following steps:

S41. The data set T containing N samples is input, $T=\{(X_1, Y_1), (X_2, Y_2), (X_3, Y_3), \ldots, (X_N, Y_N)\}$, each sample has L-type features, $X_i=(x_{i1}, x_{i2}, \ldots, x_{iL})$, corresponding to the benchmark value of M parameters of the equipment, $Y_i=(y_{i1}, y_{i2}, \ldots, y_{iM})$;

S42. The objective function of XGBoost model iteration is established:

$$O(t) = -\frac{1}{2}\sum_{k=1}^{K}\frac{G_k^2}{H_k + \lambda} + \gamma K$$

Wherein, $$G_k = \sum_{i \in I_k} \partial_{\hat{Y}^{(t-1)}} l\left(Y_i, \hat{Y}_i^{(t-1)}\right);\ H_k = \sum_{i \in I_k} \partial^2_{\hat{Y}^{(t-1)}} l\left(Y_i, \hat{Y}_i^{(t-1)}\right);$$

$\lambda$ is $L_2$ regular penalty coefficient; $\gamma$ is $L_1$ regular penalty coefficient; K is the total number of leaf nodes in the decision tree; $Y_i$ is the true value of the $i^{th}$ sample;

$$\hat{Y}_i^{(t-1)}$$

is the predicted value after the $(t-1)^{th}$ iteration of the $i^{th}$ sample; and the sample set on the leaf with index k is defined as as $I_k$;

S43. The adjustment range of XGBoost model super parameters is set, and Bayesian optimization algorithm is used to optimize XGBoost super parameters to obtain the optimal combination of super parameters;

S44. The optimal combination of super parameters is input into the XGBoost model, and the data set T is used to train according to the objective function 0 (t);

S45. The optimal combination of the super parameters is recorded if the prediction performance of the XGBoost model obtained through training meets the preset accuracy threshold, so as to obtain the benchmark value prediction model. Otherwise, step S43 is executed to optimize the XGBoost super parameters again.

Furthermore, in step S43, the XGBoost model super parameters include:

Learning rate with the parameter adjustment range of [0.1, 0.15];

Maximum depth of the tree with the parameter adjustment range of (5, 30);

Penalty term of complexity with the parameter adjustment range of (0, 30);

Randomly selected sample proportion with the parameter adjustment range of (0, 1);

Random sampling ratio of features with the parameter adjustment range of (0.2, 0.6);

L2 norm regular term of weight with the parameter adjustment range of (0, 10);

Number of decision trees with the parameter adjustment range of (500, 1000);

Minimum leaf node weight sum with the parameter adjustment range of (0, 10).

Furthermore, in step S45, the prediction performance of XGBoost model in step S45 includes average absolute percentage error and determination coefficient, and the calculation formula is as follows:

$$e_{MAPE} = \frac{\sum_{i=1}^{N}\left|\frac{\hat{Y}_i - Y_i}{Y_i}\right|}{N}$$

$$R^2 = 1 - \frac{\sum_{i=1}^{N}(\hat{Y}_i - Y_i)^2}{\sum_{i=1}^{N}(\hat{Y}_i - \overline{Y}_i)^2}$$

Wherein, $e_{MAPE}$ is the average absolute percentage error, $R^2$ is the determination coefficient, $\hat{Y}_i$ is the benchmark value of the $i^{th}$ sample in the data set, $\hat{Y}_i$ is the benchmark value predicted by the XGBoost model according to the feature $X_i$ of the $i^{th}$ sample, and $\overline{Y}_i$ is the average value of the benchmark values of the $N^{th}$ sample in the data set.

A system for predicting benchmark value of unit equipment based on XGBoost algorithm and comprises the following:

A data set construction module, which obtains the historical operation data of unit equipment, preprocesses the data, and constructs a data set containing a plurality of samples. Each sample includes a plurality of features corresponding to the benchmark values of a plurality of parameters of the equipment;

A feature selection module, which uses RF out-of-bag estimation to calculate the feature importance of the data and eliminate the features with low importance;

A standardization processing module, which standardizes the features of the samples in the data set to eliminate the dimensional impact among features;

A model construction module, which inputs the data set, constructs the XGBoost model, and conducts Bayesian super parameter optimization to obtain the benchmark value prediction model;

A prediction module, which inputs the real-time data of equipment operation, and obtains the benchmark values of each parameter of the equipment through the benchmark value prediction model.

Furthermore, the feature selection module executes the following steps:

For each feature of the sample, the random forest (RF) out-of-bag estimation is used to rank the importance of the features and select the features. The average precision decline rate (MDA) is used as an indicator to calculate the importance of the feature. The formula is as follows:

$$MDA = \frac{1}{n}\sum_{t=1}^{n}(errOOB_t - errOOB'_t);$$

Wherein, n is the number of base classifiers constructed by random forests, $errOOB_t$ is the out-of-bag error of the $t^{th}$ base classifier, and $errOOB'_t$ is the out-of-bag error of the $t^{th}$ base classifier after noise is added. The more MDA decreases, the higher the importance of the feature.

Furthermore, the model construction module executes the following steps:

Step1, the data set T containing N samples is input, $T=\{(X_1, Y_1), (X_2, Y_2), (X_3, Y_3), \ldots, (X_N, Y_N)\}$, each sample has L-type features, $X_i=(x_{i1}, x_{i2}, \ldots, x_{iL})$, corresponding to the benchmark value of M parameters of the equipment, $Y_i=(y_{i1}, y_{i2}, \ldots, y_{iM})$;

Step2. The objective function of XGBoost model iteration is established:

$$O(t) = -\frac{1}{2}\sum_{k=1}^{K}\frac{G_k^2}{H_k+\lambda} + \gamma K$$

Wherein $$G_k = \sum\nolimits_{i \in I_k} \partial_{\hat{Y}^{(t-1)}} l\left(Y_i, \hat{Y}_i^{(t-1)}\right);\ H_k = \sum\nolimits_{i \in I_k} \partial^2_{\hat{Y}^{(t-1)}} l\left(Y_i, \hat{Y}_i^{(t-1)}\right);$$

$\lambda$ is $L_2$ regular penalty coefficient; $\gamma$ is $L_1$ regular penalty coefficient; K is the total number of leaf nodes in the decision tree; $Y_i$ is the true value of the $i^{th}$ sample;

$$\hat{Y}_i^{(t-1)}$$

is the predicted value after the $(t-1)^{th}$ iteration of the $i^{th}$ sample; and the sample set on the leaf with index k is defined as as $I_k$;

Step3. The adjustment range of XGBoost model super parameters is set, and Bayesian optimization algorithm is used to optimize XGBoost super parameters to obtain the optimal combination of super parameters;

Step 4. The optimal combination of super parameters is input into the XGBoost model, and the data set T is used to train according to the objective function 0 (t);

Step 5. The optimal combination of the super parameters is recorded if the prediction accuracy of the XGBoost model obtained through training meets the preset accuracy threshold, so as to obtain the benchmark value prediction model. Otherwise, step 3 is executed to optimize the XGBoost super parameters again.

Compared with the prior art, the invention has the following advantages:

(1) The invention constructs a benchmark value prediction model based on XGBoost algorithm, and uses the machine learning algorithm to mine the correlation among data to predict a reasonable equipment benchmark value, and has the advantages of high generalization ability, high prediction accuracy and operation speed and great improvement of the automation ability of the unit.

(2) Data is preliminarily processed to eliminate the blank value, outliers and straightened line type data to avoid the interference of abnormal data, and preliminary PCA principal component analysis is carried out to screen out key features, so as to preliminarily remove similar and redundant features, reducing the calculation amount of subsequent feature selection and model training.

(3) For PCA dimensionality reduced data, RF out-of-bag estimation is used to rank and select the importance of features, further screen important features and simplify data samples while retaining key features, which can reduce over fitting, improve the model generalization ability, make the model more interpretable, enhance the understanding of the correlation between features and predicted values, and speed up the model training.

(4) XGBoost super parameter optimization is conducted through Bayesian optimization algorithm, which greatly reduces the workload of parameter adjustment in XGBoost model and speeds up the model construction.

DESCRIPTION OF THE DRAWINGS

FIG. 1 is a flowchart of the invention.

DESCRIPTION OF PREFERRED EMBODIMENTS

The embodiment and specific operation process of the invention are described in detail below in combination with the drawing and specific embodiment. The embodiment is implemented on the premise of the technical solution of the invention, but the protection scope of the invention is not limited to the following embodiment.

In the drawing, the components with the same structure are represented by the same number, and the components with similar structures or functions are represented by similar numbers. The size and thickness of each component shown in the drawing are arbitrarily given, because the invention does not define the size and thickness of each component. In order to make the diagram clearer, some parts are enlarged appropriately in the drawing.

Embodiment 1

A method for predicting benchmark value of unit equipment based on XGBoost algorithm, as shown in FIG. 1, comprises the following steps:

S1. The historical operation data of unit equipment is obtained, the data is preprocessed, and a data set containing a plurality of samples is constructed, and each sample includes the benchmark value of a plurality of parameters of the equipment corresponding to a plurality of features;

S2. RF out-of-bag estimation is used for feature importance calculation to eliminate the features with low importance;

S3. The data is standardized to eliminate the dimensional effects among features;

S4. The data set is input to construct an XGBoost model, and Bayesian super parameter optimization is conducted to obtain the prediction model of benchmark values;

S5. The real-time data of equipment operation is input, and the benchmark values of various equipment parameters are predicted by the prediction model of benchmark values.

The overall technical solution of the invention mainly includes data acquisition and preprocessing. The steps are as follows: the random forest (RF) out-of-bag estimation is used to rank the importance of the features, data is standardized, and the XGBoost model optimized by Bayesian parameters is used for modeling, and the model is used for benchmark value prediction. The Java language development data interface is used to collect historical data and for data communication between modules. The data comes from the real-time database platform plant level SIS (supervisory information system). The XGBoost package (current version 1.4.2) installed separately by Python is used to implement the algorithm. The functions of each part are as follows:

Step S1 is as follows:

S11. The historical operation data of the equipment is obtained from the plant level SIS of the unit;

S12. The data is checked for vacant values and outliers, and the data with vacant values and outliers are eliminated;

S13. The straight-line data is filtered;

S14. Data features are dimensionally reduced by PCA to obtain a data set containing multiple samples, and each sample contains multiple features.

Generally, the generator unit has a supervisory information system (SIS), which stores the historical data collected from the distributed control system (DCS) of the unit.

The applications deployed in power plants usually only read data from SIS. Real time database (now called temporal database) is the core technology of SIS. A server needs to be deployed in this solution, and the interface program of SIS real-time database needs to be deployed on the server. The historical data is collected according to the above-mentioned measuring points and stored in the open source temporal database deployed on the server.

It shall obtain the operation history data of the equipment for at least one full year to ensure data completeness. Long term data is not referential. Data is filtered by time. Based on the set time threshold, the original data with a time span of less than one year shall not be extracted. On this basis, the null data is removed. The null data is generally the data that occurs due to on-site sensor failure or abnormal data transmission. Further, the straightened line type data is filtered. The straightened line type abnormal data is defined as follows: if the value of the measured point data in a certain time interval fluctuates within the set threshold range (the threshold range is set according to different types of data), the data in this time interval is the straightened line type abnormal data. It shall be noted that the reasons for the occurrence of the straightened line type abnormal data are as follows: in some abnormal situations, such as the failure of the field sensor, the transmitted data point is not null or error, but the sensor continuously transmits the normal values of the last measurement, which is reflected in the trend chart as a straight line, and is one type of the straightened line type abnormal data.

Then, principal component analysis (PCA) is used to reduce the dimensions of the filtered features. This function is implemented through the pea module of the sklearn library in Python. The train_test_split function of the sklearn. model_selection module is called to divide the training set and the test set. During principal component analysis, the number of important features which shall be retained can be adjusted. This can be set according to the type of equipment, experience, etc., which can be understood by relevant practitioners.

In addition, every other period of time, new data is read and supplemented into the database of server on a regular basis, and data preprocessing is repeated, steps S1 to S4 are executed, and the benchmark value prediction model is updated regularly.

Step S2 is as follows:

After historical data preprocessing, RF out-of-bag estimation is used to rank the importance of main measuring points representing equipment operation features, such as unit load, current, etc. RF can be used to select features. In the process of randomly and repeatedly sampling from the original sample set for classifier training, about ⅓ of the sample data is not selected, which are called Out of Bag (OOB) data. The error rate of OOB test is recorded as errOOB. The average error of all learner based tests is calculated, and the average accuracy decline rate (MDA) is used as the index to calculate the importance of features. The formula is as follows:

$$MDA = \frac{1}{n}\sum\nolimits_{t=1}^{n}(errOOB_t - errOOB'_t),$$

Wherein, n is the number of base classifiers constructed by random forests, $errOOB_t$ is the out-of-bag error of the $t^{th}$ base classifier, and $errOOB'_t$ is the out-of-bag error of the $t^{th}$ base classifier after noise is added. The more MDA decreases, the higher the importance of the feature.

RF out-of-bag estimation is determined based on the random forest algorithm. In a random forest, multiple decision trees, namely, base classifiers, are constructed. Each decision tree can be understood as making decisions on a feature. After adding noise to a feature at random, if the out-of-bag accuracy is greatly reduced, it indicates that this feature has a great impact on the classification results of the samples, that is, the importance of this feature is high. According to the above idea, RF out-of-bag estimation can be used to rank the importance of features of the samples in the data set and select the features with higher importance. The specific number of reserved features is customized according to the equipment type and experience.

In step 3:

The features after preprocessing and feature selection usually have different dimensions and dimensional units, which affect the results of data analysis. Data shall be standardized to eliminate the dimensional effects among features. The data set contains N samples, and each sample has L-type features. Z-score standardization method is used to standardize each type of features of each sample, and centralize the feature data according to the mean value, and then scale the feature data according to the standard deviation. The processed data obey the standard normal distribution, i.e. $X \sim N(\mu,\sigma^2)$, as follows:

$$x_{nl}^* = \frac{x_{nl} - \mu_l}{\sigma_l}$$

Wherein, $x_{nl}$ is the feature data of the type 1 features of the $n^{th}$ sample, and $$x_{nl}^*$$

is the feature data of the type 1 features of the $n^{th}$ sample after standardization, $\mu_l$ is the mean value of the feature data of the type 1 features in the $N^{th}$ sample, and on is the standard deviation of the feature data of the type 1 features in the $N^{th}$ sample. XGBoost's numpy library can be used in this step to standardize the data.

Step S4 is as follows:

The principle of XGBoost algorithm is as follows:

The data set $D=\{(x_1, y_1), (x_2, Y_2), \ldots (x_i, y_i), \ldots, (x_n, y_n)\}$, $(x_i \in R^m, y_i \in R)$ is given, $x_i$ is the feature which can be understood as the vector of m, and $y_i$ indicates the label corresponding to $x_i$. For example, to predict whether the product will be purchased according to age, gender and income, x is (age, gender, income), and y is "Yes" or "No". In this application, for the equipment in the unit, the data of different measuring points of the equipment, such as current, voltage, vibration, sound, load, etc., are acquired as the features, the benchmark value of the main parameters of the equipment are taken as the label, and the input of the trained XGBoost model is the current, voltage, vibration, sound, load and other equipment operation data, as well as the output is the predicted benchmark value of each equipment.

For the objective function of XGBoost:

$$O(t) = \sum_{i=1}^{n} l\left(y_i, \hat{y}_i^{(t)}\right) + \Omega(f_k)$$

Wherein, $y_i$ is the actual value, i.e., the value in the training set;

$$\hat{y}_i^{(t)}$$

is the predicted value after the $t^{th}$ iteration of the $i^{th}$ sample; and $\Omega(f_k)$ is the regularization term. The corresponding formula of $$\hat{y}_i^{(t)}$$

and $\Omega(f_k)$ is as follows:

$$\hat{y}_i^{(t)} = \sum_{k=1}^{K} f_k(x_i) = \hat{y}_i^{(t-1)} + f_t(x_i)$$

$$\Omega(f_k) = \alpha K + \frac{1}{2}\beta\sum_{k=1}^{K}\omega_k^2$$

Wherein, K is the total number of leaf nodes in the decision tree; α and β are respectively the coefficients of $L_1$ and $L_2$ regular penalty items; and $\omega_k$ is the output value of the $k^{th}$ leaf node of the decision tree.

$$\hat{y}_i^{(t)}$$

and $\Omega(f_k)$ are substituted into the objective function 0(t), second order Taylor formula is used to expand, and the result is as follows:

$$O(t) = \sum_{i=1}^{n}\left[l\left(y_i, \hat{y}_i^{(t-1)}\right) + \partial_{\hat{y}^{(t-1)}} l\left(y_i, \hat{y}_i^{(t-1)}\right) f_t(x_i) + \frac{1}{2}\partial_{\hat{y}^{(t-1)}} l\left(y_i, \hat{y}_i^{(t-1)}\right) f_t^2(x_i)\right] + \alpha K + \frac{1}{2}\beta\sum_{k=1}^{K}\omega_k^2$$

Definition $$G_k = \sum_{i \in I_k} \partial_{\hat{y}^{(t-1)}} l\left(y_i, \hat{y}_i^{(t-1)}\right)$$

$$H_k = \sum_{i \in I_k} \partial^2_{\hat{y}^{(t-1)}} l\left(y_i, \hat{y}_i^{(t-1)}\right)$$

The objective function obtained is as follows:

$$O(t) = -\frac{1}{2}\sum_{k=1}^{K}\frac{G_k^2}{H_k + \beta} + \alpha K$$

To sum up, step S4 comprises the following steps:

Step 41. The data set T containing N samples is input, $T=\{(X_1, Y_1), (X_2, Y_2), (X_3, Y_3), \ldots, (X_N, Y_N)\}$, each sample has L-type features, $X_i=(x_{i1}, x_{i2}, \ldots, x_{iL})$, corresponding to the benchmark value of M parameters of the equipment; $Y_i=(y_{i1}, y_{i2}, \ldots, y_{iM})$ Step 42. The objective function of XGBoost model iteration is established:

$$O(t) = -\frac{1}{2}\sum_{k=1}^{K}\frac{G_k^2}{H_k + \lambda} + \gamma K$$

Wherein, $$G_k == \sum_{i \in I_k} \partial_{\hat{Y}^{(t-1)}} l\left(Y_i, \hat{Y}_i^{(t-1)}\right); H_k = \sum_{i \in I_k} \partial^2_{\hat{Y}^{(t-1)}} l\left(Y_i, \hat{Y}_i^{(t-1)}\right);$$

λ is $L_2$ regular penalty coefficient; γ is $L_1$ regular penalty coefficient; K is the total number of leaf nodes in the decision tree; $Y_i$ is the true value of the $i^{th}$ sample;

$$\hat{Y}_i^{(t-1)}$$

is the predicted value after the $(t-1)^{th}$ iteration of the $i^{th}$ sample; and the sample set on the leaf with index k is defined as as $I_k$;

S43. The adjustment range of XGBoost model super parameters is set, and Bayesian optimization algorithm is used to optimize XGBoost super parameters to obtain the optimal combination of super parameters;

The XGBoost model super parameters selected for optimization include:

Learning rate with the parameter adjustment range of [0.1, 0.15];

Maximum depth of the tree with the parameter adjustment range of (5, 30);

Penalty term of complexity with the parameter adjustment range of (0, 30);

Randomly selected sample proportion with the parameter adjustment range of (0, 1);

Random sampling ratio of features with the parameter adjustment range of (0.2, 0.6);

L2 norm regular term of weight with the parameter adjustment range of (0, 10);

Number of decision trees with the parameter adjustment range of (500, 1000);

Minimum leaf node weight sum with the parameter adjustment range of (0, 10).

S44. The optimal combination of super parameters is input into the XGBoost model, and the data set T is used to train according to the objective function 0 (t);

S45. The optimal combination of the super parameters is recorded if the prediction performance of the XGBoost model obtained through training meets the preset accuracy threshold, so as to obtain the prediction model of benchmark values. Otherwise, step S43 is executed to optimize the XGBoost super parameters again.

In step S45, the average absolute percentage error and determination coefficient are used to assess the model performance, and the calculation formula is as follows:

$$e_{MAPE} = \frac{\sum_{i=1}^{N} \left| \frac{\hat{Y}_i - Y_i}{Y_i} \right|}{N}$$

$$R^2 = 1 - \frac{\sum_{i=1}^{N} (\hat{Y}_i - Y_i)^2}{\sum_{i=1}^{N} (\hat{Y}_i - \overline{Y}_i)^2}$$

Wherein, $e_{MAPE}$ is the average absolute percentage error, $R^2$ is the determination coefficient, $Y_i$ is the benchmark value of the $i^{th}$ sample in the data set, $\hat{Y}_i$ is the benchmark value predicted by the XGBoost model according to the feature $X_i$ of the $i^{th}$ sample, and $\overline{Y}_i$ is the average value of the benchmark values of the $N^{th}$ sample in the data set.

Python's Bayesian Optimization library can be used for Bayesian super parameter optimization, designing penalty functions, and finding the global optimal value of the penalty function combining the super parameters as the optimal combination. Relevant practitioners can understand the specific content which is not repeated here. In the iterative process of optimization and model training, for the output problem of multiple solutions by XGBoost, the multioutput tregressor of the sklearn.multioutput module is used for solving. Java programming is used to realize sample input and result output between Python and temporal database. Model training, storage, prediction and scoring are completed by writing Python programs and calling the XGBoost algorithm model in sklearn of the Python machine learning library. After receiving random samples and prediction information, the XGBoost module calls Python program for training and transmits prediction results to Java program to complete prediction.

Parameter adjustment in machine learning is a tedious but crucial task, which greatly affects the performance of the algorithm. Manual parameter adjustment is time-consuming and mainly based on experience and luck. Grid search and random search do not require manpower, but need a long run time. Through Bayesian super parameter optimization, the invention quickly determines the optimal super parameters of XGBoost model, speeding up model construction.

Embodiment 2

The invention also protects a system for predicting benchmark value of unit equipment based on XGBoost algorithm, which is based on the method for predicting benchmark value of unit equipment based on XGBoost algorithm described in embodiment 1 and comprises the following:

A data set construction module, which obtains the historical operation data of unit equipment, preprocesses the data, and constructs a data set containing a plurality of samples. Each sample includes a plurality of features corresponding to the benchmark values of a plurality of parameters of the equipment;

A feature selection module, which uses RF out-of-bag estimation to calculate the feature importance of the data and eliminate the features with low importance;

A standardization processing module, which standardizes the features of the samples in the data set to eliminate the dimensional impact among features;

A model construction module, which inputs the data set, constructs the XGBoost model, and conducts Bayesian super parameter optimization to obtain the benchmark value prediction model;

A prediction module, which inputs the real-time data of equipment operation, and obtains the benchmark values of each parameter of the equipment through the benchmark value prediction model.

The specific execution of each module is described in embodiment 1, which is not repeated here.

For the prediction of the benchmark value of unit equipment, in order to solve the defects of low efficiency and low prediction accuracy of the traditional manual modeling method of power plants, the invention adopts an efficient machine learning algorithm XGBoost (extreme gradient boosting), which has the following steps: the historical operation data of unit equipment is processed to get the data meeting the healthy work conditions; RF out-of-bag estimation is used for ranking the importance of relevant features, such as unit load, current, etc., which are the main test points of equipment operation; the data is standardized; the XGBoost model after Bayesian super parameter optimization is obtained to obtain the prediction model of benchmark values; and the real-time data is input in the prediction model of benchmark values to get the required prediction value of benchmark value.

The preferred specific embodiments of the invention are described in detail above. It shall be understood that any ordinary technician in the art can make many modifications and changes according to the concept of the invention without any creative work. Therefore, any technical solution that can be obtained by any person skilled in the art according to the concept of the invention on the basis of the prior art through logical analysis, reasoning or limited experiments shall be within the scope of protection determined by the claims.

The invention claimed is:

1. A method for predicting benchmark value of unit equipment based on XGBoost algorithm is characterized by comprising the following steps:

S1. The historical operation data of unit equipment is obtained, the data is preprocessed, and a data set containing a plurality of samples is constructed, and each sample includes the benchmark value of a plurality of parameters of the equipment corresponding to a plurality of features;

S2. random forest (RF) out-of-bag estimation is used for feature importance calculation to eliminate the features with low importance;

S3. The data is standardized to eliminate the dimensional effects among features;

S4. The data set is input to construct an XGBoost model, and Bayesian super parameter optimization is conducted to obtain the prediction model of benchmark values;

S5. The real-time data of equipment operation is input, and the benchmark values of various equipment parameters are predicted by the prediction model of benchmark values, S6. Adjust the operating parameters of the equipment to the benchmark values obtained through S5;

wherein step S2 is as follows:

for each feature of the sample, the random forest (RF) out-of-bag estimation is used to rank the importance of the features and select the features, wherein the average precision decline rate (MDA) is used as an indicator to calculate the importance of the feature, and wherein the formula is as follows:

$$MDA = \frac{1}{n}\sum_{t=1}^{n}(errOOB_t - errOOB'_t),$$

wherein, n is the number of base classifiers constructed by random forests, $errOOB_t$ is the out-of-bag error of the $t^{th}$ base classifier, and $errOOB'_t$ is the out-of-bag error of the $t^{th}$ base classifier after noise is added, wherein the more MDA decreases, the higher the importance of the feature;

in step S3, the data set contains N samples, each sample has L-type features, and Z-score standardization method is used to standardize each type of features of each sample, as follows:

$$x_{nl}^{*} = \frac{x_{nl} - \mu_l}{\sigma_l}$$

wherein, $x_{nl}$ is the feature data of the type 1 features of the $n^{th}$ sample, and $$x_{nl}^{*}$$

is the feature data of the type 1 features of the $n^{th}$ sample after standardization, $\mu_l$ is the mean value of the feature data of the type 1 features in the $N^{th}$ sample, and $\sigma_l$ is the standard deviation of the feature data of the type 1 features in the $N^{th}$ sample.

2. The method for predicting benchmark value of unit equipment based on XGBoost algorithm according to claim 1, wherein S11-S14 is under S1, step S1 is as follows:

S11. The historical operation data of the equipment is obtained from the plant level supervisory information system SIS of the unit;

S12. The data is checked for blank values and outliers, and the data with blank values and outliers are eliminated;

S13. Straightened line type data is filtered;

S14. Data features are dimensionally reduced by PCA to obtain a data set containing multiple samples, and each sample contains multiple features.

3. The method for predicting benchmark value of unit equipment based on XGBoost algorithm according to claim 1 is characterized in that step S4 comprises the following steps, wherein S41-45 is under S4:

S41. The data set T containing N samples is input, $T=\{(X_1, Y_1), (X_2, Y_2), (X_3, Y_3), \ldots, (X_N, Y_N)\}$, each sample has L-type features, $X_i=(x_{i1}, x_{i2}, \ldots, x_{iL})$, corresponding to the benchmark value of M parameters of the equipment, $Y_i=(y_{i1}, y_{i2}, \ldots, y_{iM})$;

S42. The objective function of XGBoost model iteration is established:

$$O(t) = -\frac{1}{2}\sum_{k=1}^{K}\frac{G_k^2}{H_k+\lambda} + \gamma K$$

Wherein, $$G_k = \sum\nolimits_{i\in I_k}\partial_{\hat{Y}^{(t-1)}}\, l\left(Y_i, \hat{Y}_i^{(t-1)}\right); H_k = \sum\nolimits_{i\in I_k}\partial^2_{\hat{Y}^{(t-1)}}\, l\left(Y_i, \hat{Y}_i^{(t-1)}\right);$$

λ is L2 regular penalty coefficient; γ is $L_1$ regular penalty coefficient; K is the total number of leaf nodes in the decision tree; $Y_i$ is the true value of the $i^{th}$ sample;

$$\hat{Y}_i^{(t-1)}$$

is the predicted value after the $(t-1)^{th}$ iteration of the $i^{th}$ sample; and the sample set on the leaf with index k is defined as as $I_k$;

S43. The adjustment range of XGBoost model super parameters is set, and Bayesian optimization algorithm is used to optimize XGBoost super parameters to obtain the optimal combination of super parameters;

S44. The optimal combination of super parameters is input into the XGBoost model, and the data set T is used to train according to the objective function 0 (t);

S45. The optimal combination of the super parameters is recorded if the prediction performance of the XGBoost model obtained through training meets the preset accuracy threshold, so as to obtain the prediction model of benchmark values; otherwise, step S43 is executed to optimize the XGBoost super parameters again.

4. The method for predicting benchmark value of unit equipment based on XGBoost algorithm according to claim 1 is characterized in that in step S43, the XGBoost model super parameters include: Learning rate with the parameter adjustment range of [0.1, 0.15]; Maximum depth of the tree with the parameter adjustment range of (5, 30); Penalty term of complexity with the parameter adjustment range of (0, 30); Randomly selected sample proportion with the parameter adjustment range of (0, 1); Random sampling ratio of features with the parameter adjustment range of (0.2, 0.6); L2 norm regular term of weight with the parameter adjustment range of (0, 10); Number of decision trees with the parameter adjustment range of (500, 1000); Minimum leaf node weight sum with the parameter adjustment range of (0, 10).

5. The method for predicting benchmark value of unit equipment based on XGBoost algorithm according to claim 1 is characterized in that the prediction performance of XGBoost model in step S45 includes average absolute percentage error and determination coefficient and the calculation formula is as follows:

$$eMAPE = \sum i = 1N\boxtimes|Y\hat{}i - YiYi|N$$

$$R2 = 1 - \sum i = 1N\boxtimes(Y\hat{}i - Yi)2\sum i = 1N\boxtimes(Y\hat{}i - \mathrm{Y\_i})2$$

Wherein, eMAPE is the average absolute percentage error, $R^2$ is the determination coefficient, Yi is the benchmark value of the $i^{th}$ sample in the data set, $\hat{Y}_1$ is the benchmark value predicted by the XGBoost model according to the feature X of the $i^{th}$ sample, and $\hat{Y}_i$ is the average value of the benchmark values of the $N^{th}$ sample in the data set.

* * * * *